United States Patent
Xu (10) Patent No.: US 11,991,729 B2
(45) Date of Patent: May 21, 2024

(54) RESOURCE CONFIGURATION METHOD AND APPARATUS, AND COMMUNICATION DEVICE

(71) Applicant: GUANGDONG OPPO MOBILE TELECOMMUNICATIONS CORP., LTD., Guangdong (CN)

(72) Inventor: Jing Xu, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 448 days.

(21) Appl. No.: 17/221,612

(22) Filed: Apr. 2, 2021

(65) Prior Publication Data
US 2021/0282147 A1  Sep. 9, 2021

Related U.S. Application Data

(63) Continuation of application No. PCT/CN2019/080622, filed on Mar. 29, 2019.

(30) Foreign Application Priority Data

Oct. 9, 2018 (WO) ............... PCT/CN2018/109530

(51) Int. Cl.
*H04W 72/53* (2023.01)
*H04L 1/1812* (2023.01)
(Continued)

(52) U.S. Cl.
CPC ........... *H04W 72/53* (2023.01); *H04L 1/1819* (2013.01); *H04W 72/0446* (2013.01); *H04W 72/0453* (2013.01); *H04W 72/23* (2023.01)

(58) Field of Classification Search
CPC ............ H04W 72/53; H04W 72/0446; H04W 72/0453; H04W 72/23; H04L 1/1819
See application file for complete search history.

(56) References Cited

U.S. PATENT DOCUMENTS 8,929,319 B2 * 1/2015 Anderson ........... H04W 74/006
370/329
2015/0189574 A1 * 7/2015 Ng ........................ H04W 24/08
370/254
(Continued)

FOREIGN PATENT DOCUMENTS

CN 105592556 A 5/2016
CN 105991224 A 10/2016
(Continued)

OTHER PUBLICATIONS

3GPP "NR; NR and NG-RAN Overall Description; Stage 2 (Release 15)" 3GPP TS 38.300 V15.3.1 (Oct. 2018); Technical Specification. 92 pages.
(Continued)

Primary Examiner — Mohammad S Anwar
(74) Attorney, Agent, or Firm — Perkins Coie LLP (57) ABSTRACT

Implementations of the present disclosure provide a resource configuration method and apparatus, and a communication device. The method comprises: transmitting high-level signaling and physical layer signaling, the high-level signaling comprising configuration information of at least one preconfigured resource, and the physical layer signaling being used for determining a preconfigured resource to be activated or deactivated.

20 Claims, 3 Drawing Sheets

(51) Int. Cl.
  *H04W 72/0446* (2023.01)
  *H04W 72/0453* (2023.01)
  *H04W 72/23* (2023.01)

(56) References Cited

U.S. PATENT DOCUMENTS

| | | | | |
|---|---|---|---|---|
| 2017/0295601 A1* | 10/2017 | Kim | ...................... | H04W 72/20 |
| 2018/0139734 A1 | 5/2018 | Babaei et al. | | |
| 2018/0288746 A1* | 10/2018 | Zhang | ................... | H04L 1/0031 |
| 2018/0295651 A1* | 10/2018 | Cao | ................... | H04W 74/0833 |

FOREIGN PATENT DOCUMENTS

| | | | |
|---|---|---|---|
| CN | 107734543 | A | 2/2018 |
| CN | 108023705 | A | 5/2018 |
| CN | 108111276 | A | 6/2018 |
| CN | 108135028 | A | 6/2018 |
| EP | 3096577 | A1 | 11/2016 |
| WO | 2018019085 | A1 | 2/2018 |

OTHER PUBLICATIONS

3GPP "NR; Radio Resource Control (RRC) protocol specification (Release 15)" 3GPP TS 38.331 V15.3.0 (Sep. 2018); Technical Specification. 445 pages.
Huawei et al. "Enhanced UL configured grant transmissions" R1-1810159; 3GPP TSG RAN WG1 Meeting #94bis; Chengdu, China; Oct. 8-12, 2018. 10 pages.
Intel Corporation "Enhancements to configured grant PUSCH" R1-1810787; 3GPPT SG RAN WG1 Meeting #94bis; Chengdu, China; Oct. 8-12, 2018. 7 pages.
Nokia et al. "On Configured Grant Enhancements for NR URLLC" R1-1810662; 3GPP TSG RAN WG1 Meeting #94bis; Chengdu, China; Oct. 8-12, 2018. 12 pages.
Notice of Reasons for Refusal for Japanese Application No. 2021-519542 dated Jan. 6, 2023. 13 pages with English translation.
Examination Report for Indian Application No. 202127018426 dated Feb. 16, 2022. 7 pages with English translation.
International Search Report dated Jun. 21, 2019 cited in PCT/CN2019/080622.
International Search Report dated Jul. 12, 2019 cited in PCT/CN2018/109530.
Extended European Search Report for European Application No. 19870890.1 dated Nov. 24, 2021. 9 pages.
Notice of Reasons for Refusal of the Japanese application No. 2021-519542, dated Jun. 20, 2023. 6 pages with English translation.
First Office Action of the Australian application No. 2019356616, dated Aug. 4, 2023. 3 pages.
Hearing Notice of the Indian application No. 202127018426, issued on Mar. 14, 2024. 3 pages.

* cited by examiner

FIG. 1

Transmit a high layer signaling and a physical layer signaling, herein the higher layer signaling includes configuration information of at least one pre-configured resource, and the physical layer signaling is used for determining a pre-configured resource which needs to be activated or deactivated     201

FIG. 2

Transmit a higher layer signaling and a physical layer signaling, herein the higher layer signaling includes configuration information of a pre-configured resource group, the pre-configured resource group includes at least one pre-configured resource, and the physical layer signaling is at least used for indicating group information of the pre-configured resource group; herein a pre-configured resource belonging to a same pre-configured resource group shares at least one parameter of target configuration information of a physical layer     301

RESOURCE CONFIGURATION METHOD AND APPARATUS, AND COMMUNICATION DEVICE

CROSS-REFERENCE TO RELATED APPLICATION

This application is a continuation application of International application No. PCT/CN2019/080622 filed on Mar. 29, 2019, which claims priority to PCT/CN2018/109530 filed on Oct. 9, 2018, all of which the entire disclosure is hereby incorporated by reference.

TECHNICAL FIELD

Implementations of the present disclosure relate to the technical field of mobile communication, specifically to a method for configuring a resource, an apparatus, and a communication device.

BACKGROUND

In a $5^{th}$ Generation (5G) New Radio (NR) system, an Ultra Reliable & Low Latency Communication (URLLC) service is introduced, of which a feature is performing a transmission with ultra-reliability (for example, 99.999%) within an extreme short latency (for example, 1 ms). In order to achieve this objective, a concept of grant free is put forward. Grant free adopts a pre-configured\semi-persistent configuration mode of a resource, and the terminal may transmit on the configured resource according to a service requirement.

At present, configuring one grant free resource needs one piece of Downlink Control Information (DCI). Accordingly, configuring multiple grant free resources needs multiple pieces of DCI, which leads to an increase in overhead of downlink control signaling and may even cause congestion of Physical Downlink Control Channel (PDCCH).

SUMMARY

Implementations of the present disclosure provide a method, an apparatus, a terminal, and a communication device.

An implementation of the present disclosure provides a resource configuration method, which includes transmitting a higher layer signaling and a physical layer signaling, herein the higher layer signaling includes configuration information of at least one pre-configured resource, and the physical layer signaling is used for determining a pre-configured resource which needs to be activated or deactivated.

An implementation of the present disclosure provides a resource configuration method, which includes transmitting a higher layer signaling and a physical layer signaling, herein the higher layer signaling includes configuration information of a pre-configured resource group, the pre-configured resource group includes at least one pre-configured resource, and the physical layer signaling is at least used for indicating group information of the pre-configured resource group; herein a pre-configured resource belonging to a same pre-configured resource group shares at least one parameter of target configuration information of a physical layer.

An implementation of the present disclosure provides an apparatus for configuring a resource, which includes a transmitting unit, and the transmitting unit is configured to transmit a higher layer signaling and a physical layer signaling, herein the higher layer signaling includes configuration information of at least one pre-configured resource, and the physical layer signaling is used for determining a pre-configured resource which needs to be activated or deactivated.

An implementation of the present disclosure provides an apparatus for configuring a resource, which includes a transmitting unit, and the transmitting unit is configured to transmit a higher layer signaling and a physical layer signaling, herein the higher layer signaling includes configuration information of one pre-configured resource group, the pre-configured resource group includes at least one pre-configured resource, and the physical layer signaling is at least used for indicating group information of the pre-configured resource group; herein a pre-configured resource belonging to a same pre-configured resource group shares at least one parameter of target configuration information of a physical layer.

An implementation of the present disclosure provides a communication device, which includes a processor and a memory. The memory is configured to store a computer program, and the processor is configured to call and run the computer program stored in the memory to execute the method for configuring a resource described above.

An implementation of the present disclosure provides a chip. The chip is configured to implement the method for configuring a resource described above.

Specifically, the chip includes a processor, configured to call and run a computer program from a memory to enable a device mounted with the chip to perform the method for configuring a resource described above.

An implementation of the present disclosure provides a computer readable storage medium. The computer readable storage medium is configured to store a computer program which enables a computer to perform the method for configuring a resource described above.

An implementation of the present disclosure provides a computer program product. The computer program product includes computer program instructions which enable a computer to perform the method for configuring a resource described above.

An implementation of the present disclosure provides a computer program. When the computer program is run on a computer, the computer is enabled to perform the method for configuring a resource described above.

BRIEF DESCRIPTION OF DRAWINGS

Drawings described herein are used to provide a further understanding of the present disclosure and form a part of the present disclosure. Illustrative examples of the present disclosure and the description thereof are used to explain the present disclosure and do not constitute improper limitation of the present disclosure. In the drawings.

DETAILED DESCRIPTION

Technical solutions in implementations of the present disclosure will be described below with reference to the drawings in the implementations of the present disclosure. It is apparent that the implementations described are just some implementations of the present disclosure, but not all implementations of the present disclosure. According to the implementations of the present disclosure, all other implementations achieved by a person of ordinary skill in the art without paying an inventive effort are within the protection scope of the present disclosure.

The technical solutions of the implementations of the present disclosure may be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, a LTE Frequency Division Duplex (FDD) system, a LTE Time Division Duplex (TDD) system, a Universal Mobile Telecommunication System (UMTS), a Worldwide Interoperability for Microwave Access (WiMAX) communication system, or a 5G system.

Figure 1:
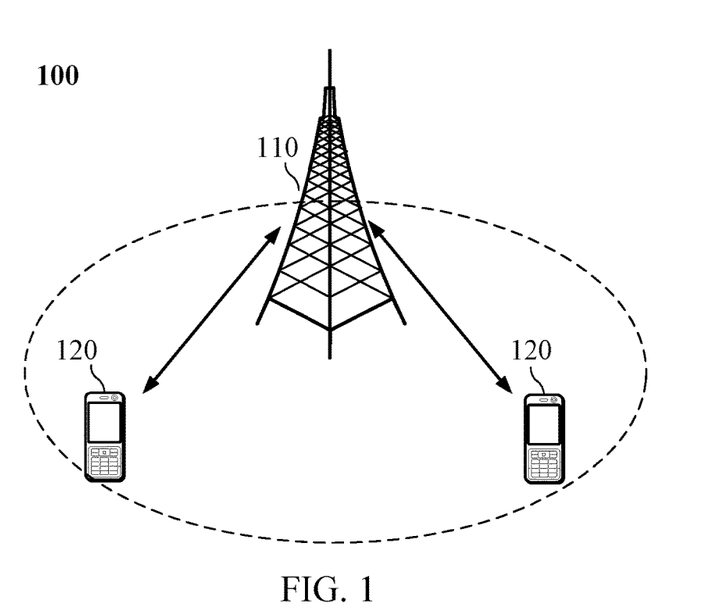
FIG. 1 is a schematic diagram of an architecture of a communication system according to an implementation of the present disclosure.

Illustratively, a communication system 100 to which an implementation of the present disclosure is applied is shown in FIG. 1. The communication system 100 may include a network device 110, and the network device 110 may be a device that communicates with a terminal 120 (or referred to as a communication terminal, or a terminal). The network device 110 may provide communication coverage for a specific geographical area, and may communicate with terminals located within the coverage area. Optionally, the network device 110 may be a Base Transceiver Station (BTS) in a GSM system or CDMA system, a NodeB (NB) in a WCDMA system, an Evolutional Node B (eNB or eNodeB) in a LTE system, or a radio controller in a Cloud Radio Access Network (CRAN), or the network device may be a network side device in a mobile switch center, a relay station, an access point, a vehicle-mounted device, a wearable device, a hub, a switch, a bridge, a router or a 5G network, or a network device in a future evolved Public Land Mobile Network (PLMN), etc.

The communication system 100 also includes at least one terminal 120 located within a coverage range of the network device 110. As used herein, the "terminal" includes, but not limited to, an apparatus configured to receive/send a communication signal, via a wired circuit connection, for example, via Public Switched Telephone Networks (PSTN), a Digital Subscriber Line (DSL), a digital cable, a direct cable connection; and/or another data connection/network; and/or via a wireless interface, for instance, for a cellular network, a Wireless Local Area Network (WLAN), a digital television network such as a DVB-H network, a satellite network, or an AM-FM broadcast sender; and/or another terminal; and/or an Internet of Things (IoT) device. A terminal configured to communicate via a wireless interface may be referred to as a "wireless communication terminal", a "wireless terminal" or a "mobile terminal". Examples of the mobile terminal include, but not limited to, a satellite or cellular telephone, a Personal Communication System (PCS) terminal capable of combining with a cellular wireless telephone and data processing, faxing, and data communication abilities, a Personal Digital Assistant (PDA) that may include a radio telephone, a pager, an internet/intranet access, a Web browser, a memo pad, a calendar, and/or a Global Positioning System (GPS) receiver, and a conventional laptop and/or palmtop receiver or other electronic apparatus including a radio telephone transceiver. The terminal may be referred to an access terminal, a User Equipment (UE), a subscriber unit, a subscriber station, a mobile station, a mobile platform, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device or a computing device with a wireless communication function, or other processing device connected to a wireless modem, a vehicle-mounted device, a wearable device, a terminal in a 5G network, or a terminal in a future evolved PLMN, or the like.

Optionally, Device to Device (D2D) communication may be performed between the terminals 120.

Optionally, the 5G system or 5G network may be referred to as a New Radio (NR) system or a NR network.

FIG. 1 illustrates one network device and two terminals. Optionally, the communication system 100 may include multiple network devices, and other quantity of terminals may be included within a coverage range of each network device, which is not limited by the implementations of the present disclosure.

Optionally, the communication system 100 may include other network entities such as a network controller, and a mobile management entity. Implementations of the present disclosure are not limited thereto.

It should be understood that, a device with a communication function in a network/system in the implementations of the present disclosure may be referred to as a communication device. Taking the communication system 100 shown in FIG. 1 as an example, the communication device may include a network device 110 and a terminal 120 which have communication functions, and the network device 110 and the terminal 120 may be specific devices described above, which will not be repeated here. The communication device may also include other device in the communication system 100, e.g., other network entities such as a network controller, a mobile management entity, etc., which is not limited by the implementations of the present disclosure.

It should be understood that the terms "system" and "network" are often used interchangeably in this document. The term "and/or" in this document is merely an association relationship describing associated objects, indicating that there may be three relationships, for example, A and/or B may indicate three cases: A alone, A and B, and B alone. In addition, the symbol "/" in this document generally indicates that objects before and after the symbol "/" have an "or" relationship.

In order to facilitate understanding of technical solutions of implementations of the present disclosure, related technologies referred to by the implementations of the present disclosure will be explained below.

Grant free adopts a preconfigured\semi-persistent configuration mode of a resource, and a terminal may transmit on a configured resource according to a service requirement.

The technology avoids a process of Schedule request (SR) and Buffer Status Report (BSR), and increases effective transmission time of the terminal.

There are two kinds of grant free configuration mode: type 1 and type 2. Herein, type 1 adopts a Radio Resource Control (RRC) signaling (semi-static) to configure a grant free resource, and configuration performed by the RRC signaling at least includes time-frequency domain resource information, reference symbol information, a Modulation and Coding Scheme (MCS), and a power control parameter. Type2 adopts a method of combining an RRC signaling and a physical layer signaling (semi-static configuration, dynamic activation/deactivation). Configuration performed by the RRC signaling at least includes a time domain resource period and a power control parameter, and configuration performed by the physical layer signaling at least includes frequency domain resource information, reference symbol information, and a Modulation and Coding Scheme.

No matter which grant free configuration mode it is, resources are all semi-statically/semi-persistently configured, but service requirements (such as a transmission block size (TBS), MCS, etc.) are dynamic. Therefore, it is necessary to configure multiple grant free resources to adapt to different services.

In addition, in order to ensure reliable transmission of a service, repeated transmission is also introduced. However, as a starting point of repeated transmission is flexible, but an end point is definite, a current mechanism can't guarantee that a quantity of repeated transmissions meets a preset value. Therefore, it is considered to configure multiple grant free resources to adapt to and configure different starting points, adapt to incoming services at any time, and ensure multiple repeated transmissions.

Figure 2:
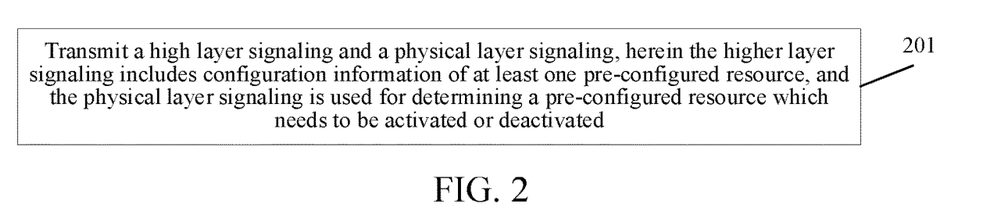
FIG. 2 is a first schematic flow diagram of a method for configuring a resource according to an implementation of the present disclosure.

FIG. 2 is a first schematic flow diagram of a method for configuring a resource according to an implementation of the present disclosure. As shown in FIG. 2, the method for configuring a resource includes act 201.

In act 201, transmitting a high layer signaling and a physical layer signaling, herein the higher layer signaling includes configuration information of at least one pre-configured resource, and the physical layer signaling is used for determining a pre-configured resource which needs to be activated or deactivated.

In an implementation, a technical solution of the implementation of the present disclosure is applied to a terminal side. Specifically, a terminal receives the higher layer signaling and the physical layer signaling. Here, the terminal may be any device that can communicate with a network, such as a mobile phone, a tablet computer, a vehicle-mounted terminal, a notebook, etc.

In another implementation, a technical solution of the implementation of the present disclosure is applied to a network side. Specifically, a network device sends the higher layer signaling and the physical layer signaling. Here, the network device refers to a base station, such as a gNB in 5G, an eNB in 4G, etc.

In an implementation of the present disclosure, the higher layer signaling includes an RRC signaling, and the physical layer signaling includes a DCI signaling.

In an implementation of the present disclosure, the higher layer signaling includes configuration information of at least one pre-configured resource, and the physical layer signaling is used for determining a pre-configured resource which needs to be activated or deactivated.

It should be noted that a pre-configured resource refers to a semi-persistently configured resource, such as a configured grant resource or a grant free resource.

In an implementation of the present disclosure, when the network side configures multiple pre-configured resources, the multiple pre-configured resources may be configured by a higher layer signaling, or may be configured respectively by multiple higher layer signalings. For example, a higher layer signaling 1 configures grant free resources 1, 2, 3, 4 . . . 10. For another example: the higher layer signaling 1 configures grant free resources 1, 2, 3, 4, and 5, and a higher layer signaling 2 configures grant free resources 6, 7, 8, 9, and 10.

In an implementation of the present disclosure, the configuration information of the pre-configured resource includes a group of resource parameters and resource index information of the pre-configured resource, herein the group of resource parameters refers to at least one resource parameter needed for performing an uplink transmission.

For example, the higher layer signaling configures multiple grant free resources, including: grant free resources 1, 2, 3, 4 . . . 10, herein each grant free resource is configured with a group of complete resource parameters and resource index information (such as resource serial number), and the group of complete resource parameters refers to all parameters needed for being able to perform an uplink transmission. Type 1 configure grant parameter ("ConfiguredGrantConfig"+"rrc-ConfiguredUplinkGrant"), for example.

In an implementation of the present disclosure, the physical layer signaling is used for indicating at least one pre-configured resource, herein the at least one pre-configured resource indicated by the physical layer signaling is a pre-configured resource that needs to be activated or deactivated.

In an implementation of the present disclosure, the physical layer signaling indicates at least one pre-configured resource by reusing one or more of following information fields: a hybrid automatic repeat request process number information field, a Redundancy version (RV) information field, or a Transmit Power Control (TPC) command information field (such as an information field of a TPC command for scheduled PUSCH). According to the technical solution of the present disclosure, by reusing an existing information field, a DCI size may not be increased, which avoids increasing blind detection complexity.

In an implementation of the present disclosure, the physical layer signaling may indicate at least one pre-configured resource in one of following modes.

In mode one, the physical layer signaling includes first bitmap information, herein each bit in the first bitmap information corresponds to one pre-configured resource configured by the higher layer signaling, and a value of the bit is used for indicating whether a corresponding pre-configured resource is activated or deactivated.

For example, the physical layer indicates at least one grant free resource through one piece of DCI. Specifically, a bitmap mode may be adopted, for example, 10 bit in the DCI corresponds to grant free resources 1, 2, 3, 4 . . . 10 configured by the higher layer signaling. Whether a corresponding grant free resource needs to be activated or deactivated (that is, whether the grant free resource takes effect) is indicated by a value (1/0) of each bit.

In mode two, the physical layer signaling includes at least one piece of resource index information, herein each piece of resource index information in the at least one piece of resource index information corresponds to one pre-configured resource configured by the higher layer signaling.

For example, the physical layer indicates at least one grant free resource through one piece of DCI. Specifically, 9 bits in the DCI are used for indicating whether at most 3 grant free resources need to be activated or deactivated (that is, whether the grant free resources take effect). For example, 001010000 indicates that grant free resources 1, 2 need to be activated or deactivated.

In the above solution, a quantity of pre-configured resources indicated in the physical layer signaling is configured by the network side or predetermined by a protocol. Further, the quantity of pre-configured resources indicated in the physical layer signaling is less than or equal to a quantity of pre-configured resources configured by the higher layer signaling.

For example, a quantity of grant free resources included in one DCI signaling may be configured directly or indirectly (depending on the quantity of grant free resources configured by the higher layer signaling), or as predetermined by a protocol.

Particularly, by means of a first physical layer signaling, at least one first pre-configured resource is indicated to be a pre-configured resource which needs to be activated, and when a second physical layer signaling is transmitted, the second physical layer signaling indicates that at least one second pre-configured resource is a pre-configured resource which needs to be activated, and the at least one first pre-configured resource indicated by the first physical layer signaling needs to be deactivated.

For example, deactivation of a grant free resource may be achieved by an activation signaling of a new grant free resource. For example, a physical layer signaling 1 activates grant free resources 1 and 2, and when a physical layer signaling 2 activates grant free resources 3 and 4, the grant free resources 1 and 2 are deactivated by default.

Figure 3:
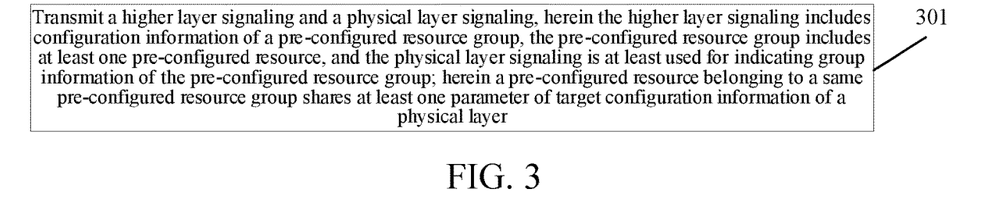
FIG. 3 is a second schematic flow diagram of a method for configuring a resource according to an implementation of the present disclosure.

FIG. 3 is a second schematic flow diagram of a method for configuring a resource according to an implementation of the present disclosure. As shown in FIG. 3, the method for configuring a resource includes act 301.

In act 301, transmitting a higher layer signaling and a physical layer signaling, herein the higher layer signaling includes configuration information of one pre-configured resource group, the pre-configured resource group includes at least one pre-configured resource, and the physical layer signaling is at least used for indicating group information of the pre-configured resource group; herein the pre-configured resource belonging to a same pre-configured resource group shares at least one parameter of target configuration information of physical layer.

In an implementation, a technical solution of the implementation of the present disclosure is applied to a terminal side. Specifically, a terminal receives the higher layer signaling and the physical layer signaling. Here, the terminal may be any device that can communicate with a network, such as a mobile phone, a tablet computer, a vehicle-mounted terminal, a notebook, etc.

In another implementation, a technical solution of the implementation of the present disclosure is applied to a network side. Specifically, a network device sends the higher layer signaling and the physical layer signaling. Here, the network device refers to a base station, such as a gNB in 5G, an eNB in 4G, etc.

In an implementation of the present disclosure, the higher layer signaling includes an RRC signaling, and the physical layer signaling includes a DCI signaling.

In an implementation of the present disclosure, at least one of following configurations of each pre-configured resource in the pre-configured resource group configured by the higher layer signaling is independent: a time domain resource, a frequency domain resource, a Demodulation Reference Signal (DMRS), or an offset of a Hybrid Automatic Repeat request Identification (HARQ ID).

In an implementation of the present disclosure, one pre-configured resource group is configured by one higher layer signaling. One pre-configured resource group may also be configured by multiple higher layer signalings, which is not limited.

It should be noted that a pre-configured resource in the pre-configured resource group refers to a semi-persistently configured resource, such as a configured grant resource or a grant free resource.

For example, the higher layer signaling configures one grant free resource group, and one grant free resource group includes at least one grant free resource. The physical layer signaling indicates a grant free resource group number. Further, the grant free resource belonging to a same grant free resource group shares other configuration information of physical layer. Assuming that one grant free resource group includes three grant free resources, and in an example, the three grant free resources at least have different configurations of time domain resource.

In an implementation, the higher layer signaling includes a time domain starting symbol position of at least one pre-configured resource. For example, the higher layer signaling configures three values in the time domain resource domain, which correspond to time domain starting symbols of three grant free resources respectively. The physical layer signaling indicates other information in a time domain resource field, such as a grant free resource group number.

Below, table 1 is information composition of ConfiguredGrantConfig, herein an absolute address of the time domain starting symbol is configured for the time domain resource.

TABLE 1

| ConfiguredGrantConfig ::= | SEQUENCE { |
|---|---|
| frequencyHopping | ENUMERATED {mode1, mode2 } |
| cg-DMRS-Configuration | DMRS-UplinkConfig, |
| mcs-Table | ENUMERATED {qam256, spare1} |
| mcs-TableTransformPrecoder | ENUMERATED {qam256, spare1} |
| uci-OnPUSCH | SetupRelease { CG-UCI-OnPUSCH }, |
| resourceAllocation | ENUMERATED  { resourceAllocationType0, resourceAllocationType1, dynamicSwitch }, |
| rbg-Size | ENUMERATED {config2} |
| powerControlLoopToUse | ENUMERATED {n0, n1}, |
| p0-PUSCH-Alpha | P0-PUSCH-AlphaSetId, |
| transformPrecoder | ENUMERATED {enabled} |
| nrofHARQ-Processes | INTEGER (1..16), |

TABLE 1-continued

| | |
|---|---|
| repK | ENUMERATED {n1, n2, n4, n8}, |
| repK-RV | ENUMERATED {s1-0231, s2-0303, s3-0000} |
| periodicity | ENUMERATED { sym2, sym7, sym1x14, sym2x14, sym4x14, sym5x14, sym8x14, sym10x14, sym16x14, sym20x14, sym32x14, sym40x14, sym64x14, sym80x14, sym128x14, sym160x14, sym256x14, sym320x14, sym512x14, sym640x14, sym1024x14, sym1280x14, sym2560x14, sym5120x14, sym6, sym1x12, sym2x12, sym4x12, sym5x12, sym8x12, sym10x12, sym16x12, sym20x12, sym32x12, sym40x12, sym64x12, sym80x12, sym128x12, sym160x12, sym256x12, sym320x12, sym512x12, sym640x12, sym1280x12, sym2560x12 }, |
| configuredGrantTimer | INTEGER (1..64) |
| Time domain resource size) | Sequence (size (repK) ) of interger (Time resource table |
| rrc-ConfiguredUplinkGrant | SEQUENCE { |
|     timeDomainOffset | INTEGER (0..5119), |
|     timeDomainAllocation | INTEGER (0..15), |
|     frequencyDomainAllocation | BIT STRING (SIZE (18) ), |
|     antennaPort | INTEGER (0..31), |
|     dmrs-SeqInitialization | INTEGER (0..1) |
|     precodingAndNumberOfLayers (0..15), | INTEGER (0..63), |
|     srs-ResourceIndicator | INTEGER (0..15), |
|     mcsAndTBS | INTEGER (0..31), |
|     frequencyHoppingOffset | INTEGER (1.. maxNrofPhysicalResourceBlocks-1) |
|     pathlossReference Index (0..maxNrofPUSCH-PathlossReferenceRSs-1), ... } } | INTEGER |
| CG-UCI-OnPUSCH ::= CHOICE { | |
|   dynamic | SEQUENCE (SIZE (1..4) ) OF BetaOffsets, |
|   semiStatic } | BetaOffsets |

In another implementation, the higher layer signaling includes offset information of the time domain starting symbol of at least one pre-configured resource relative to a reference symbol, wherein the time domain starting symbols of different pre-configured resources are different or same relative to the reference symbol. Further, if the second higher layer signaling includes offset information of a time domain starting symbol of at least one grant free resource relative to a reference symbol, the second physical layer signaling is also used for indicating a position of the reference symbol. For example, for the time domain starting symbols of three grant free resources, the higher layer signaling configures offset information relative to a time domain starting symbol of one previous grant free resource. E.g., offset 1 of a grant free resource 2 relative to a grant free resource 1, offset 2 of a grant free resource 3 relative to a grant free resource 2, and the physical layer signaling indicates that a time domain starting symbol position of the grant free resource 1 is symbol n, then, a time domain starting symbol position of a grant free resource 2 is symbol n+ offset 1, and a time domain starting symbol position of a grant free resource 3 is symbol n+ offset 1+ offset 2.

Below, table 2 is information composition of ConfiguredGrantConfig, herein offset information of the time domain starting symbol is configured for a time domain offset.

TABLE 2

| | |
|---|---|
| ConfiguredGrantConfig ::= | SEQUENCE { |
|   frequencyHopping | ENUMERATED {mode1, mode2} |
|   cg-DMRS-Configuration | DMRS-UplinkConfig, |
|   mcs-Table | ENUMERATED {qam256, spare1} |
|   mcs-TableTransformPrecoder | ENUMERATED {qam256, spare1} |
|   uci-OnPUSCH | SetupRelease { CG-UCI-OnPUSCH }, |
|   resourceAllocation | ENUMERATED { resourceAllocationType0, resourceAllocationType1, dynamicSwitch }, |
|   rbg-Size | ENUMERATED { config2 } |
|   powerControlLoopToUse | ENUMERATED {n0, n1}, |
|   p0-PUSCH-Alpha | P0-PUSCH-AlphaSetId, |
|   transformPrecoder | ENUMERATED { enabled} |
|   nrofHARQ-Processes | INTEGER (1..16), |

TABLE 2-continued

| | |
|---|---|
| repK | ENUMERATED {n1, n2, n4, n8}, |
| repK-RV | ENUMERATED {s1-0231, s2-0303, s3-0000} |
| periodicity | ENUMERATED { |
| | sym2, sym7, sym1x14, sym2x14, sym4x14, sym5x14, sym8x14, sym10x14, sym16x14, sym20x14, sym32x14, sym40x14, sym64x14, sym80x14, sym128x14, sym160x14, sym256x14, sym320x14, sym512x14, sym640x14, sym1024x14, sym1280x14, sym2560x14, sym5120x14, sym6, sym1x12, sym2x12, sym4x12, sym5x12, sym8x12, sym10x12, sym16x12, sym20x12, sym32x12, sym40x12, sym64x12, sym80x12, sym128x12, sym160x12, sym256x12, sym320x12, sym512x12, sym640x12, sym1280x12, sym2560x12 |
| | }, |
| configuredGrantTimer | INTEGER (1..64) |
| Time domain offset | Sequence (size (repK-1) ) of interger (0...13) |
| rrc-ConfiguredUplinkGrant | SEQUENCE { |
|     timeDomainOffset | INTEGER (0..5119), |
|     timeDomainAllocation | INTEGER (0..15), |
|     frequencyDomainAllocation | BIT STRING (SIZE (18) ), |
|     antennaPort | INTEGER (0..31), |
|     dmrs-SeqInitialization | INTEGER (0..1) |
|     precodingAndNumberOfLayers | INTEGER (0..63), |
|     srs-Resource Indicator | INTEGER (0..15), |
|     mcsAndTBS | INTEGER (0..31), |
|     frequencyHoppingOffset | INTEGER (1.. maxNrofPhysicalResourceBlocks-1) |
|     pathlossReference Index (0..maxNrofPUSCH-PathlossReferenceRSs-1), | INTEGER |
|     ... | |
| } | |
| } | |
| CG-UCI-OnPUSCH ::= CHOICE { | |
|   dynamic | SEQUENCE (SIZE (1..4) ) OF BetaOffsets, |
|   semiStatic | BetaOffsets |
| } | |

In an implementation, the higher layer signaling includes a frequency domain starting resource of at least one pre-configured resource.

In another implementation, the higher layer signaling includes offset information of a frequency domain starting resource of at least one pre-configured resource relative to a reference frequency domain resource, wherein frequency domain starting resources of different pre-configured resources are different or same relative to a reference frequency domain resource. Further, if the higher layer signaling includes offset information of a frequency domain starting resource of at least one pre-configured resource relative to the reference frequency domain resource, the physical layer signaling is also used for indicating a position of the reference frequency domain resource.

In an implementation, the higher layer signaling includes a DMRS port or a DMRS sequence of at least one pre-configured resource.

In an implementation, the higher layer signaling includes an offset of a HARQ ID of at least one pre-configured resource. Further, the offset of the HARQ ID is related to the offset information of the time domain starting symbol of at least one pre-configured resource relative to the reference symbol, for example, a value order of the two is opposite. For example, the time domain offset is [2 4 6 8], then the offset of the HARQ ID is [8 6 4 2]. According to the technical solution of the present disclosure, it is achieved that a HARQ ID is shared among multiple pre-configured resources, which reduces consumption of the HARQ ID.

Figure 4:
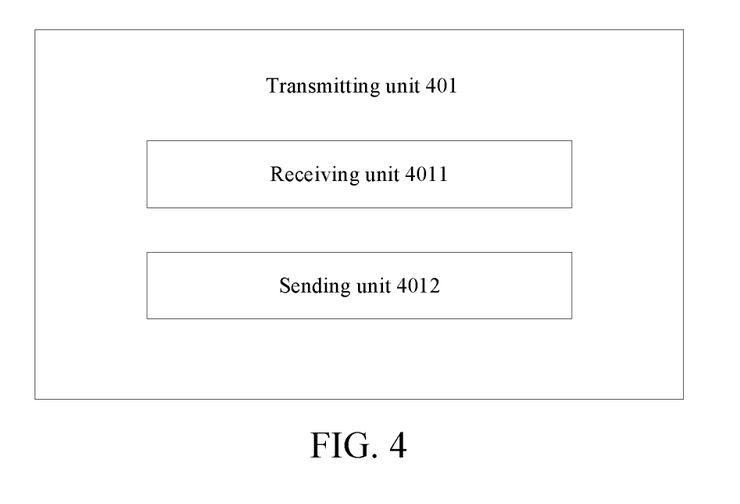
FIG. 4 is a schematic diagram of structural composition of an apparatus for configuring a resource according to an implementation of the present disclosure.

FIG. 4 is a schematic diagram of structural composition of an apparatus for configuring a resource according to an implementation of the present disclosure. As shown in FIG. 4, the apparatus for configuring a resource includes a transmitting unit 401.

In the implementation of the present disclosure, the transmitting unit 401 is configured to transmit a higher layer signaling and a physical layer signaling, herein the higher layer signaling includes configuration information of at least one pre-configured resource, and the physical layer signaling is used for determining a pre-configured resource which needs to be activated or deactivated.

In an implementation, the configuration information of the pre-configured resource includes a group of resource parameters and resource index information of the pre-configured resource, herein the group of resource parameters refers to at least one resource parameter needed for performing an uplink transmission.

In an implementation, the physical layer signaling is used for indicating at least one pre-configured resource, herein the at least one pre-configured resource indicated by the physical layer signaling is a pre-configured resource that needs to be activated or deactivated.

In an implementation, the physical layer signaling indicates at least one pre-configured resource by reusing one or more of following information fields: a HARQ process number information field, an RV information field, or a Transmit Power Control command (TPC) used for a scheduled Physical Uplink Shared Channel (PUSCH) information field. According to the technical solution of the present disclosure, by reusing an existing information field, a DCI size may not be increased, which avoids increasing blind detection complexity.

In an implementation, the physical layer signaling includes first bitmap information, herein each bit in the first bitmap information corresponds to one pre-configured resource configured by the higher layer signaling, and a value of the bit is used for indicating whether the corresponding pre-configured resource is activated or deactivated.

In an implementation, the physical layer signaling includes at least one piece of resource index information, herein each piece of resource index information in the at least one piece of resource index information corresponds to one pre-configured resource configured by the higher layer signaling.

In an implementation, a quantity of pre-configured resources indicated in the physical layer signaling is configured by the network side or predetermined by a protocol.

In an implementation, the quantity of pre-configured resources indicated in the physical layer signaling is less than or equal to a quantity of pre-configured resources configured by the higher layer signaling.

In an implementation, a first physical layer signaling indicates at least one first pre-configured resource to be a pre-configured resource which needs to be activated, and when a second physical layer signaling is transmitted, the second physical layer signaling indicates that at least one second pre-configured resource is a pre-configured resource which needs to be activated, and the at least one first pre-configured resource indicated by the first physical layer signaling needs to be deactivated.

In an implementation, the transmitting unit 401 includes: a receiving unit 4011, configured to receive the higher layer signaling and the physical layer signaling.

In an implementation, the transmitting unit 401 includes: a sending unit 4012, configured to send the higher layer signaling and the physical layer signaling.

In an implementation, the higher layer signaling includes an RRC signaling, and the physical layer signaling includes a DCI signaling.

In an implementation of the present disclosure, the transmitting unit 401 is configured to transmit a higher layer signaling and a physical layer signaling, herein the higher layer signaling includes configuration information of one pre-configured resource group, the pre-configured resource group includes at least one pre-configured resource, and the physical layer signaling is at least used for indicating group information of the pre-configured resource group; herein the pre-configured resource belonging to a same pre-configured resource group shares at least one parameter of target configuration information of physical layer.

In an implementation, the physical layer signaling indicates at least one pre-configured resource by reusing one or more of following information fields: a HARQ process number information field, an RV information field, or a TPC command information field. According to the technical solution of the present disclosure, by reusing an existing information field, a DCI size may not be increased, which avoids increasing blind detection complexity.

In an implementation, at least one of following configurations of each pre-configured resource in the pre-configured resource group configured by the higher layer signaling is independent: a time domain resource, a frequency domain resource, a DMRS, an offset of a HARQ ID.

In an implementation, the higher layer signaling includes a time domain starting symbol position of at least one pre-configured resource; or, the higher layer signaling includes offset information of the time domain starting symbol of at least one pre-configured resource relative to a reference symbol, herein the time domain starting symbols of different pre-configured resources are different or same relative to the reference symbol.

In an implementation, if the higher layer signaling includes offset information of a time domain starting symbol of at least one pre-configured resource relative to a reference symbol, the physical layer signaling is also used for indicating a position of the reference symbol.

In an implementation, the higher layer signaling includes a frequency domain starting resource of at least one pre-configured resource; or, the higher layer signaling includes offset information of a frequency domain starting resource of at least one pre-configured resource relative to a reference frequency domain resource, herein frequency domain starting resources of different pre-configured resources are different or same relative to the reference frequency domain resource.

In an implementation, if the higher layer signaling includes offset information of a frequency domain starting resource of at least one pre-configured resource relative to a reference frequency domain resource, the physical layer signaling is also used for indicating a position of the reference frequency domain resource.

In an implementation, the higher layer signaling includes a DMRS port or a DMRS sequence of at least one pre-configured resource.

In an implementation, the higher layer signaling includes an offset of a HARQ ID of at least one pre-configured resource. Further, the offset of the HARQ ID is related to the offset information of the time domain starting symbol of at least one pre-configured resource relative to the reference symbol, for example, a value order of the two is opposite. For example, the time domain offset is [2 4 6 8], then the offset of the HARQ ID is [8 6 4 2]. According to the technical solution of the present disclosure, it is achieved that an HARQ ID is shared among multiple pre-configured resources, which reduces consumption of the HARQ ID.

In an implementation, the transmitting unit 401 includes: a receiving unit 4011, configured to receive the higher layer signaling and the physical layer signaling.

In an implementation, the transmitting unit 401 includes: a sending unit 4012, configured to send the higher layer signaling and the physical layer signaling.

In an implementation, the higher layer signaling includes an RRC signaling, and the physical layer signaling includes a DCI signaling.

Those skilled in the art should understand that the relevant description of the above apparatus for configuring a resource of the implementation of the present disclosure may be understood with reference to the relevant description of the method for configuring a resource of the implementation of the present disclosure.

Figure 5:
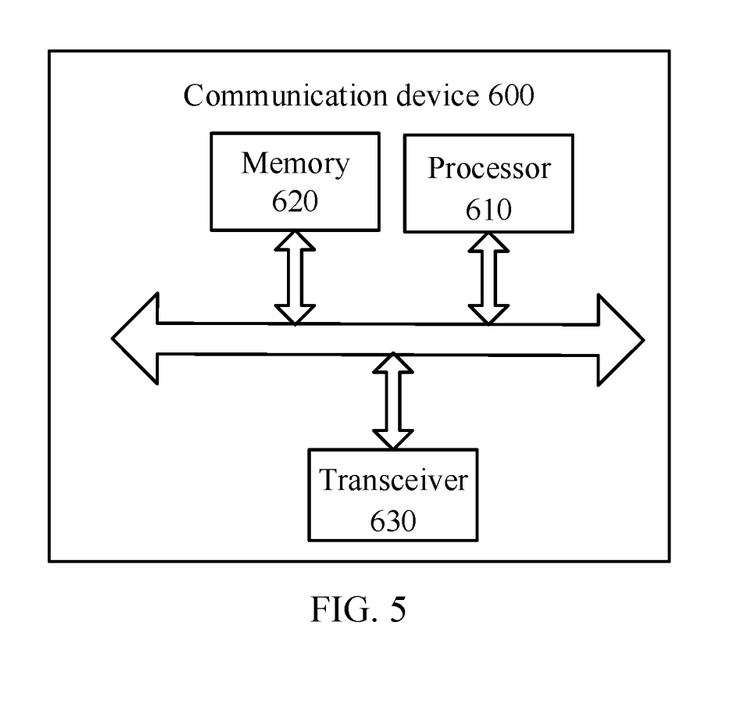
FIG. 5 is a schematic diagram of a structure of a communication device according to an implementation of the present disclosure.

FIG. 5 is a schematic diagram of a structure of a communication device 600 according to an implementation of the present disclosure. The communication device may be a terminal or a network device. The communication device 600 shown in FIG. 5 includes a processor 610. The processor 610 may call and run a computer program from a memory to implement the method in the implementation of the present disclosure.

Optionally, as shown in FIG. 5, the communication device 600 may further include a memory 620. The processor 610 may call and run a computer program from the memory 620 to implement the method in the implementation of the present disclosure.

The memory 620 may be a separate device independent of the processor 610 or may be integrated in the processor 610.

Optionally, as shown in FIG. 5, the communication device 600 may further include a transceiver 630, and the processor 610 may control the transceiver 630 to communicate with other device. Specifically, information or data may be sent to other device, or information or data sent by other device is received.

The transceiver 630 may include a transmitter and a receiver. The transceiver 630 may further include an antenna, and a quantity of antennas may be one or more.

Optionally, the communication device 600 may specifically be a network device of the implementation of the present disclosure, and the communication device 600 may implement corresponding processes implemented by the network device in various methods of the implementations of the present disclosure, which will not be repeated here for brevity.

Optionally, the communication device 600 may be specifically a mobile terminal/terminal of the implementations of the present disclosure, and the communication device 600 may implement corresponding processes implemented by the mobile terminal/terminal in various methods of the implementations of the present disclosure, which will not be repeated here for brevity.

Figure 6:
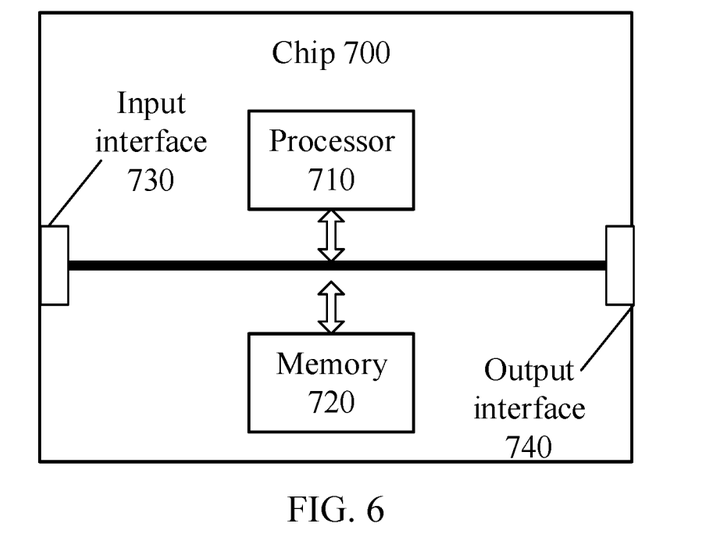
FIG. 6 is a schematic diagram of a structure of a chip according to an implementation of the present disclosure.

FIG. 6 is a schematic diagram of a structure of a chip according to an implementation of the present disclosure. A chip 700 shown in FIG. 6 includes a processor 710. The processor 710 may call and run a computer program from a memory to implement the method in the implementation of the present disclosure.

Optionally, as shown in FIG. 6, the chip 700 may further include a memory 720. The processor 710 may call and run a computer program from the memory 720 to implement the method in the implementation of the present disclosure.

The memory 720 may be a separate device independent of the processor 710 or may be integrated in the processor 710.

Optionally, the chip 700 may further include an input interface 730. The processor 710 may control the input interface 730 to communicate with other device or chip. Specifically, the processor 710 may acquire information or data sent by other device or chip.

Optionally, the chip 700 may further include an output interface 740. The processor 710 may control the output interface 740 to communicate with other device or chip. Specifically, the processor 710 may output information or data to other device or chip.

Optionally, the chip may be applied in a network device of the implementation of the present disclosure, and the chip may implement the corresponding processes implemented by the network device in various methods of the implementations of the present disclosure, which will not be repeated here for brevity.

Optionally, the chip may be applied in a mobile terminal/terminal of the implementation of the present disclosure, and the chip may implement corresponding processes implemented by the mobile terminal/terminal in various methods of the implementations of the present disclosure, which will not be repeated here for brevity.

It should be understood that the chip mentioned in the implementation of the present disclosure may be referred to as a system-level chip, a system chip, a chip system or a system-on-chip, etc.

Figure 7:
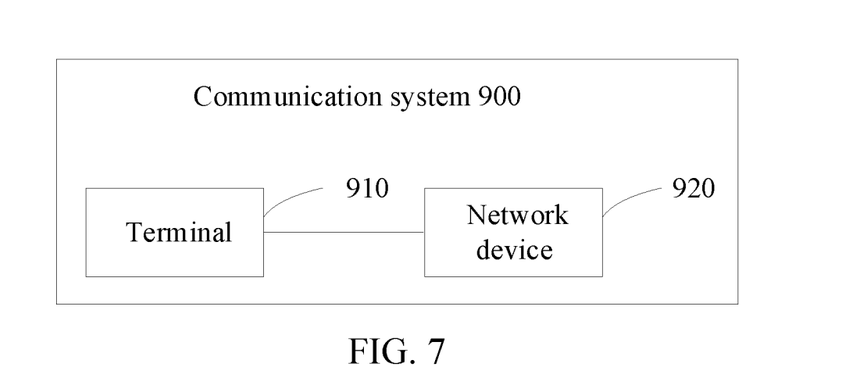
FIG. 7 is a schematic block diagram of a communication system according to an implementation of the present disclosure.

FIG. 7 is a schematic block diagram of a communication system 900 according to an implementation of the present disclosure. As shown in FIG. 7, the communication system 900 includes a terminal 910 and a network device 920.

Herein, the terminal 910 may be configured to implement the corresponding functions implemented by the terminal in the above-mentioned method, and the network device 920 may be configured to implement the corresponding functions implemented by the network device in the above-mentioned method, which will not be repeated here for brevity.

It should be understood that, the processor in the implementation of the present disclosure may be an integrated circuit chip having a signal processing capability. In an implementation process, steps of the foregoing method implementations may be implemented by using an integrated logic circuit of hardware in the processor or instructions in a form of software. The processor may be a general purpose processor, a digital signal processor (DSP), an application specific integrated circuit (ASIC), a field programmable gate array (FPGA) or another programmable logic device, a discrete gate or a transistor logic device, or a discrete hardware component. The processor may implement or perform methods, steps and logical block diagrams disclosed in the implementations of the present disclosure. The general purpose processor may be a microprocessor, or the processor may be any conventional processor or the like. The steps of the method disclosed with reference to the implementations of the present disclosure may be directly implemented by a hardware decoding processor, or may be implemented by a combination of hardware and software modules in the decoding processor. The software modules may be located in a storage medium commonly used in the art, such as a random access memory, a flash memory, a read-only memory, a programmable read-only memory or an electrically erasable programmable memory, or a register. The storage medium is located in the memory, and the processor reads the information in the memory and performs the acts of the above method in combination with its hardware.

It may be understood that, the memory in the implementations of the present disclosure of the present disclosure may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. Through illustrative but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct Rambus dynamic random access memory (DR RAM). It should be noted that the memory in the systems and methods described in this specification is intended to including but not limited to these and any memory of other proper types.

It should be understood that, the foregoing memory is an example for illustration and should not be construed as a limitation. For example, optionally, the memory in the implementations of the present disclosure may be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), a Direct Rambus RAM (DR RAM), or the like. That is, memories in the implementations of the present disclosure are intended to include, but are not limited to, these and any other suitable types of memories.

An implementation of the present disclosure further provides a computer readable storage medium configured to store a computer program.

Optionally, the computer readable storage medium may be applied in a network device of the implementations of the present disclosure, and the computer program causes a computer to perform corresponding processes implemented by the network device in various methods of the implementations of the present disclosure, which will not be repeated here for brevity.

Optionally, the computer readable storage medium may be applied in a mobile terminal/terminal of the implementations of the present disclosure, and the computer program causes a computer to perform corresponding processes implemented by the mobile terminal/terminal in various methods of the implementations of the present disclosure, which will not be repeated here for brevity.

An implementation of the present disclosure also provides a computer program product including computer program instructions.

Optionally, the computer program product may be applied in a network device of the implementations of the present disclosure, and the computer program instructions cause a computer to perform corresponding processes implemented by the network device in various methods of the implementations of the present disclosure, which will not be repeated here for brevity.

Optionally, the computer program product may be applied in a mobile terminal/terminal of the implementations of the present disclosure, and the computer program instructions cause a computer to perform corresponding processes implemented by the mobile terminal/terminal in various methods of the implementations of the present disclosure, which will not be repeated here for brevity.

An implementation of the present disclosure also provides a computer program.

Optionally, the computer program may be applied in a network device of the implementations of the present disclosure. When the computer program is run on a computer, the computer is caused to perform corresponding processes implemented by the network device in various methods of the implementations of the present disclosure, which will not be repeated here for brevity.

Optionally, the computer program may be applied in a mobile terminal/terminal of the implementations of the present disclosure. When the computer program is run on a computer, the computer is caused to perform corresponding processes implemented by the mobile terminal/terminal in various methods of the implementations of the present disclosure, which will not be repeated here for brevity.

Those of ordinary skill in the art will recognize that the example elements and algorithm acts described in combination with the implementations disclosed herein may be implemented in electronic hardware, or a combination of computer software and electronic hardware. Whether these functions are implemented in hardware or software depends on a specific application and design constraints of the technical solution. Skilled artisans may use different methods to implement the described functions in respect to each particular application, but such implementation should not be considered to be beyond the scope of the present disclosure.

Those skilled in the art may clearly understand that for convenience and conciseness of description, specific working processes of the systems, apparatuses and units described above may refer to the corresponding processes in the method implementations and will not be described here.

In several implementations provided by the present disclosure, it should be understood that the disclosed systems, apparatuses and methods may be implemented in other ways. For example, the apparatus implementations described above are only illustrative, for example, the division of the units is only a logical function division, and there may be other division modes in actual implementation, for example, multiple units or components may be combined or integrated into another system, or some features may be ignored or not executed. On the other hand, the displayed or discussed mutual coupling or direct coupling or communication connection shown or discussed may be indirect coupling or communication connection through some interface, apparatus or unit. The indirect coupling or communication connection may be in electrical, mechanical or other forms.

The unit described as a separate component may or may not be physically separated, and the component shown as a unit may or may not be a physical unit, i.e., it may be located in one place or may be distributed over multiple network units. Some or all of the units may be selected according to actual needs to achieve the purpose of the implementations.

In addition, various functional units in various implementations of the present disclosure may be integrated in one processing unit, or the various units may be physically present separately, or two or more units may be integrated in one unit.

When the functions are implemented in the form of software functional units and sold or used as an independent product, the software functional units may be stored in a computer readable storage medium. Based on this understanding, the technical solution of the present disclosure, in essence, or the part contributing to the prior art, or the part of the technical solution, may be embodied in the form of a software product stored in a storage medium. The computer software product is stored in as storage medium and includes several instructions for instructing a computer device (which may be a personal computer, a server, or a network device and the like) to perform all or part of the acts of the method described in various implementations of the present disclosure. The foregoing storage medium includes various mediums capable of storing program codes, such as a USB flash drive, a removable hard disk, a read-only memory (ROM), a random access memory (RAM), a magnetic disk, or an optical disc.

The foregoing descriptions are merely specific implementations of the present disclosure, but are not intended to limit the protection scope of the present disclosure. Any variation or substitution that may be readily conceived by a person skilled in the art within the technical scope disclosed by the present disclosure shall be included within the protection scope of the present disclosure. Therefore, the protection scope of the present disclosure shall be determined by the protection scope of the claims.

What is claimed is:

1. A resource configuration method, comprising:
 receiving, by a terminal device, a Radio Resource Control (RRC) signaling and a Downlink Control Information (DCI) signaling, wherein the RRC signaling comprises configuration information of a plurality of pre-configured resources, and the DCI signaling is used for indicating at least one pre-configured resource of the plurality of pre-configured resources, wherein the at least one pre-configured resource indicated by the DCI signaling is a pre-configured resource which needs to be activated or deactivated;
 wherein the DCI signaling reuses one or more of following information fields to indicate at least one pre-configured resource of the plurality of pre-configured resources: a Hybrid Automatic Repeat request (HARQ)

process number information field, a Redundancy Version (RV) information field, or a Transmit Power Control (TPC) command information field.

2. The method of claim 1, wherein configuration information of each pre-configured resource comprises a group of resource parameters and resource index information of the each pre-configured resource, wherein the group of resource parameters refers to at least one resource parameter needed for performing an uplink transmission.

3. The method of claim 1, wherein the DCI signaling comprises at least one piece of resource index information, wherein each piece of resource index information in the at least one piece of resource index information corresponds to a pre-configured resource configured by the RRC signaling.

4. The method of claim 1, wherein a quantity of pre-configured resources indicated in the DCI signaling is less than or equal to a quantity of pre-configured resources configured by the RRC signaling.

5. The method of claim 1, wherein a quantity of pre-configured resources indicated in the DCI signaling is configured by a network side or predetermined by a protocol.

6. A resource configuration method, comprising:
sending, by a network device, a Radio Resource Control (RRC) signaling and a Downlink Control Information (DCI) signaling, wherein the RRC signaling comprises configuration information of a plurality of pre-configured resources, and the DCI signaling is used for indicating at least one pre-configured resource of the plurality of pre-configured resources; wherein the at least one pre-configured resource indicated by the DCI signaling is a pre-configured resource which needs to be activated or deactivated;
wherein the DCI signaling reuses one or more of following information fields to indicate at least one pre-configured resource of the plurality of pre-configured resources: a Hybrid Automatic Repeat request (HARQ) process number information field, a Redundancy Version (RV) information field, or a Transmit Power Control (TPC) command information field.

7. The method of claim 6, wherein configuration information of each pre-configured resource comprises a group of resource parameters and resource index information of the each pre-configured resource, wherein the group of resource parameters refers to at least one resource parameter needed for performing an uplink transmission.

8. The method of claim 6, wherein the DCI signaling comprises at least one piece of resource index information, wherein each piece of resource index information in the at least one piece of resource index information corresponds to a pre-configured resource configured by the RRC signaling.

9. The method of claim 6, wherein a quantity of pre-configured resources indicated in the DCI signaling is less than or equal to a quantity of pre-configured resources configured by the RRC signaling.

10. The method of claim 6, wherein a quantity of pre-configured resources indicated in the DCI signaling is configured by a network side or predetermined by a protocol.

11. A terminal device, comprising a processor and a transceiver, wherein the processor is configured to control the transceiver to receive a Radio Resource Control (RRC) signaling and a Downlink Control Information (DCI) signaling, wherein the RRC signaling comprises configuration information of a plurality of pre-configured resources, and the DCI signaling is used for indicating at least one pre-configured resource of the plurality of pre-configured resources, wherein the at least one pre-configured resource indicated by the DCI signaling is a pre-configured resource which needs to be activated or deactivated;
wherein the DCI signaling reuses one or more of following information fields to indicate at least one pre-configured resource of the plurality of pre-configured resources: a Hybrid Automatic Repeat request (HARQ) process number information field, a Redundancy Version (RV) information field, or a Transmit Power Control (TPC) command information field.

12. The terminal device of claim 11, wherein configuration information of each pre-configured resource comprises a group of resource parameters and resource index information of the each pre-configured resource, wherein the group of resource parameters refers to at least one resource parameter needed for performing an uplink transmission.

13. The terminal device of claim 11, wherein the DCI signaling comprises at least one piece of resource index information, wherein each piece of resource index information in the at least one piece of resource index information corresponds to a pre-configured resource configured by the RRC signaling.

14. The terminal device of claim 11, wherein a quantity of pre-configured resources indicated in the DCI signaling is less than or equal to a quantity of pre-configured resources configured by the RRC signaling.

15. The terminal device of claim 11, wherein a quantity of pre-configured resources indicated in the DCI signaling is configured by a network side or predetermined by a protocol.

16. A network device, comprising a processor and a transceiver, wherein the processor is configured to control the transceiver to send a Radio Resource Control (RRC) signaling and a Downlink Control Information (DCI) signaling, wherein the RRC signaling comprises configuration information of a plurality of pre-configured resources, and the DCI signaling is used for indicating at least one pre-configured resource of plurality of pre-configured resources; wherein the at least one pre-configured resource indicated by the DCI signaling is a pre-configured resource which needs to be activated or deactivated;
wherein the DCI signaling reuses one or more of following information fields to indicate at least one pre-configured resource of the plurality of pre-configured resources: a Hybrid Automatic Repeat request (HARQ) process number information field, a Redundancy Version (RV) information field, or a Transmit Power Control (TPC) command information field.

17. The network device of claim 16, wherein configuration information of each pre-configured resource comprises a group of resource parameters and resource index information of the each pre-configured resource, wherein the group of resource parameters refers to at least one resource parameter needed for performing an uplink transmission.

18. The network device of claim 16, wherein the DCI signaling comprises at least one piece of resource index information, wherein each piece of resource index information in the at least one piece of resource index information corresponds to a pre-configured resource configured by the RRC signaling.

19. The network device of claim 16, wherein a quantity of pre-configured resources indicated in the DCI signaling is less than or equal to a quantity of pre-configured resources configured by the RRC signaling.

20. The network device of claim 16, wherein a quantity of pre-configured resources indicated in the DCI signaling is configured by a network side or predetermined by a protocol.

* * * * *